US008660970B1

(12) United States Patent
Fiedorowicz

(10) Patent No.: US 8,660,970 B1
(45) Date of Patent: Feb. 25, 2014

(54) PASSIVE LEARNING AND AUTONOMOUSLY INTERACTIVE SYSTEM FOR LEVERAGING USER KNOWLEDGE IN NETWORKED ENVIRONMENTS

(75) Inventor: Jeff A. Fiedorowicz, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 846 days.

(21) Appl. No.: 12/428,934

(22) Filed: Apr. 23, 2009

(51) Int. Cl.
*G06E 1/00* (2006.01)
*G06E 3/00* (2006.01)
*G06F 15/18* (2006.01)
*G06G 7/00* (2006.01)
*G06N 3/02* (2006.01)

(52) U.S. Cl.
USPC ............... 706/15; 706/14; 704/275; 700/19; 715/716

(58) Field of Classification Search
None
See application file for complete search history.

(56) References Cited

U.S. PATENT DOCUMENTS

| 6,850,252 B1 * | 2/2005 | Hoffberg | 715/716 |
| 2002/0156753 A1 * | 10/2002 | Pirim | 706/15 |
| 2006/0229739 A1 * | 10/2006 | Morikawa | 700/19 |
| 2007/0050191 A1 * | 3/2007 | Weider et al. | 704/275 |
| 2009/0144211 A1 * | 6/2009 | O'Sullivan et al. | 706/14 |

OTHER PUBLICATIONS

Tecuci et al., "Teaching Virtual Experts for Multi-Domain Collaborative Planning", Journal of Software, vol. 3, No. 3, Mar. 2008, pp. 38-59.
Naone, "TR10: Intelligent Software Assistant", MIT Technology Review, Mar./Apr. 2009, pp. 1-3.
Vance, "Microsoft mapping Course to a Jetsons-Style Future" Mar. 1, 2008, New York Times, pp. 1-3.
Goertzel et al., "XIA-MAN: An Extensible, Integrative Architecture for Intelligent Humanoid Robotics", 2008, Association for the Advancement of Artificial Intelligence, pp. 1-10.
Forbus et al., "Companion Cognitive Systems: Deesign Goals and Some Lessons Learned", 2008, Association for the Advancement of Artificial Intelligence, pp. 1-7.

* cited by examiner

*Primary Examiner* — Kakali Chaki
*Assistant Examiner* — Luis Sitiriche
(74) *Attorney, Agent, or Firm* — Yee & Associates, P.C.

(57) ABSTRACT

The different advantageous embodiments may provide a method, apparatus, and computer program product for passively learning and autonomously executing tasks on behalf of a user. The different advantageous embodiments may provide an apparatus that comprises a processing unit and a synthetic representation process executed by the processing unit. The synthetic representation process may be capable of executing a number of tasks for a user.

20 Claims, 8 Drawing Sheets

US 8,660,970 B1

PASSIVE LEARNING AND AUTONOMOUSLY INTERACTIVE SYSTEM FOR LEVERAGING USER KNOWLEDGE IN NETWORKED ENVIRONMENTS

BACKGROUND INFORMATION

1. Field

The present disclosure relates generally to a method and apparatus for passively learning and autonomously interacting with systems and persons in a network environment.

2. Background

In the workplace, people are inundated with requests for their time and attention. This demand on people is exacerbated by the increased availability of information and information sources through network technology. Wireless communications and wireless networking allow for constant connectedness. While there have been initiatives to create virtual assistants or virtual butlers to offload trivial work from a user, these efforts have resulted in systems that are capable of performing very specific and very simple functions. Further, these systems often require the user to spend precious time up-front to train the system before the user receives any net benefit from these systems.

Current intelligent systems that have been developed to capture domain knowledge and automate reasoning require a considerable effort up-front by domain or subject matter experts. The knowledge of these experts is coded into the knowledge base of the intelligent system. The domain knowledge of these current intelligent systems is a static representation that does not represent specific knowledge and experience of an individual user.

Therefore, it would be advantageous to have a method and apparatus that takes into account one or more of the issues discussed above, as well as possibly other issues.

SUMMARY

The different advantageous embodiments may provide a method, apparatus, and computer program product for passively learning and autonomously executing tasks on behalf of a user. The different advantageous embodiments may provide an apparatus that comprises a processing unit and a synthetic representation process executed by the processing unit. The synthetic representation process may be capable of executing a number of tasks for a user.

The different advantageous embodiments may also provide an apparatus that comprises a network, a processing unit connected to the network, and a synthetic representation executed by the processing unit. The synthetic representation may be capable of integrating a number of processing modules located on the processing unit to execute a number of tasks on behalf of a user.

The different advantageous embodiments may further provide a method for executing tasks. The method may monitor a number of actions made by a user. A synthetic representation process may be generated for the user using information received from monitoring the user. In response to detecting an event, a number of tasks may be executed using the synthetic representation for the user.

The different advantageous embodiments may further provide a computer program product, on a computer recordable storage medium, having computer usable program code for executing tasks. The computer program product may comprise computer usable program code for monitoring the user for input and receiving input data from the user. The input data received may be processed using a number of input processing modules to form input-oriented data. The input-oriented data may be processed using a number of cognitive processing modules to form output-oriented data. The output-oriented data may be processed using a number of output processing modules to form output data. The output may be presented using an interface.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
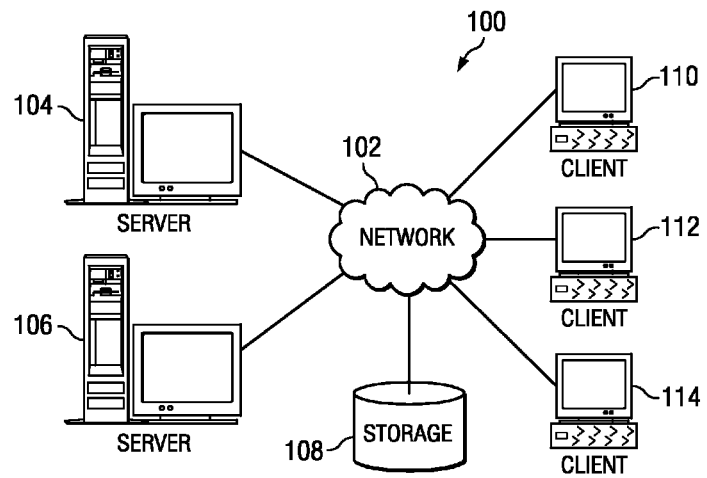
FIG. 1 is an illustration of a network of data processing systems in which the advantageous embodiments may be implemented.
Figure 2:
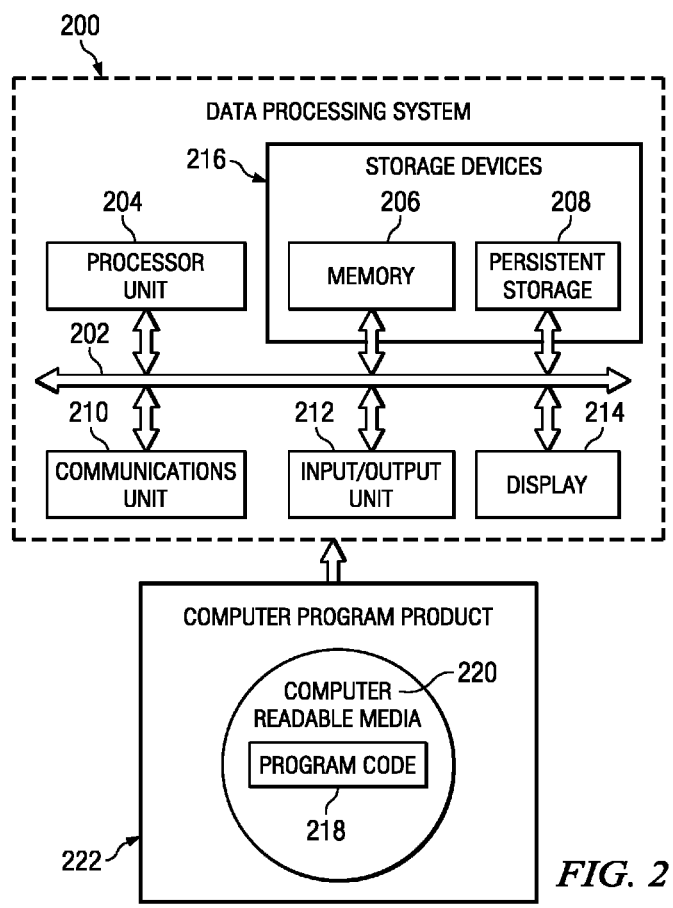
FIG. 2 is an illustration of a data processing system in accordance with an advantageous embodiment.

With reference now to the figures and in particular with reference to FIGS. 1-2, diagrams of data processing environments are provided in which advantageous embodiments may be implemented. It should be appreciated that FIGS. 1-2 are only illustrative examples and are not intended to assert or imply any limitation with regard to the environments in which different embodiments may be implemented. Many modifications to the depicted environments may be made.

FIG. 1 depicts an illustration of a network of data processing systems in which the advantageous embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. A synthetic representation process, such as synthetic representation process 302 in FIG. 3, may be implemented on one or more systems within a network of data processing system, such as clients 110, 112, and 114, and/or server 104 and 106. Clients 110, 112, and 114 are clients to server 104 in this example. In these examples, server 104, server 106, client 110, client 112, and client 114 may be computers. Network data processing system 100 may include additional servers, clients, and other devices not shown.

Network data processing system 100 provides an environment in which a synthetic representation system may interact with a number of persons and/or other systems and in particular, may create and present synthetic representations for display within network data processing system 100. For example, a synthetic representation system executing on client 114 may observe interactions and computing activities by a user utilizing client 114 and create a synthetic representation of the user that interacts with other people or systems, such as client 112 and client 110, in an illustrative example.

In the depicted example, network data processing system 100 is the Internet with network 102 representing a worldwide collection of networks and gateways that use the Transmission Control Protocol/Internet Protocol (TCP/IP) suite of protocols to communicate with one another. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, an illustration of a data processing system is depicted in accordance with an illustrative embodiment. Data processing system 200 is an example of a computer, such as client 114 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user. For example, in an illustrative embodiment, display 214 may present a synthetic representation of the user.

Instructions for the operating system, applications and/or programs may be located in storage devices 216, which are in communication with processor unit 204 through communications fabric 202. In these illustrative examples the instruction are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory that is connected to data processing system 200. The tangible form of computer readable media 220 is also referred to as computer recordable storage media. In some instances, computer recordable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as found in an interface and memory controller hub that may be present in communications fabric 202.

The different advantageous embodiments recognize and take into account a number of different considerations. For example, the different advantageous embodiments recognize and take into account that current intelligent systems, agents, and/or associates that have been developed to capture domain knowledge and automate reasoning require a considerable effort up-front by domain or subject matter experts. The knowledge of these experts is coded into the knowledge base of the intelligent system. The domain knowledge of these current intelligent systems is a static representation that does not continue to expand or adapt over time as new situations are encountered. Additionally, these current intelligent systems do not represent the specific knowledge and experience of each user that attempts to leverage such a system.

The different advantageous embodiments also recognize and take into account that these intelligent systems are not developed to capture the human dimension of work, namely the emotions and feelings of each user that affect his or her reasoning, and the prior relationships or experiences that the user has with other people in general or with respect to a specific task. Thus, the different advantageous embodiments recognize a need for a mechanism that creates a virtual representation of a user that looks, sounds, thinks, infers, and/or interacts like its specific user. The different advantageous embodiments also recognize a need for a mechanism that autonomously performs tasks and communicates with people in a manner consistent with the behavioral and cognitive model of its specific user.

Therefore, one or more of the different advantageous embodiments may provide a method, apparatus, and computer program product for passively learning and autonomously executing tasks on behalf of a user. The different advantageous embodiments may provide an apparatus that comprises a processing unit and a synthetic representation process executed by the processing unit. The synthetic representation may be capable of executing a number of tasks on behalf of a user.

The different advantageous embodiments may also provide an apparatus that comprises a network, a processing unit connected to the network, and a synthetic representation executed by the processing unit. The synthetic representation may be capable of integrating a number of processing modules located on the processing unit to execute a number of tasks on behalf of a user.

The different advantageous embodiments may further provide a method for passively learning and autonomously executing tasks on behalf of a user. The method may monitor the user for input and receive input data from the user. The input data received may be processed using a number of input processing modules to form input-oriented data. The input-oriented data may be processed using a number of cognitive processing modules to form output-oriented data. The output-oriented data may be processed using a number of output processing modules to form output data.

The different advantageous embodiments also may provide a computer program product, on a computer recordable storage medium, having computer usable program code for passively learning and autonomously executing tasks on behalf of a user. The computer program product may comprise computer usable program code for monitoring the user for input and receiving input data from the user. The input data received may be processed using a number of input processing modules to form input-oriented data. The input-oriented data may be processed using a number of cognitive processing modules to form output-oriented data. The output-oriented data may be processed using a number of output processing modules to form output data. The output may be presented using an interface.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

Figure 3:
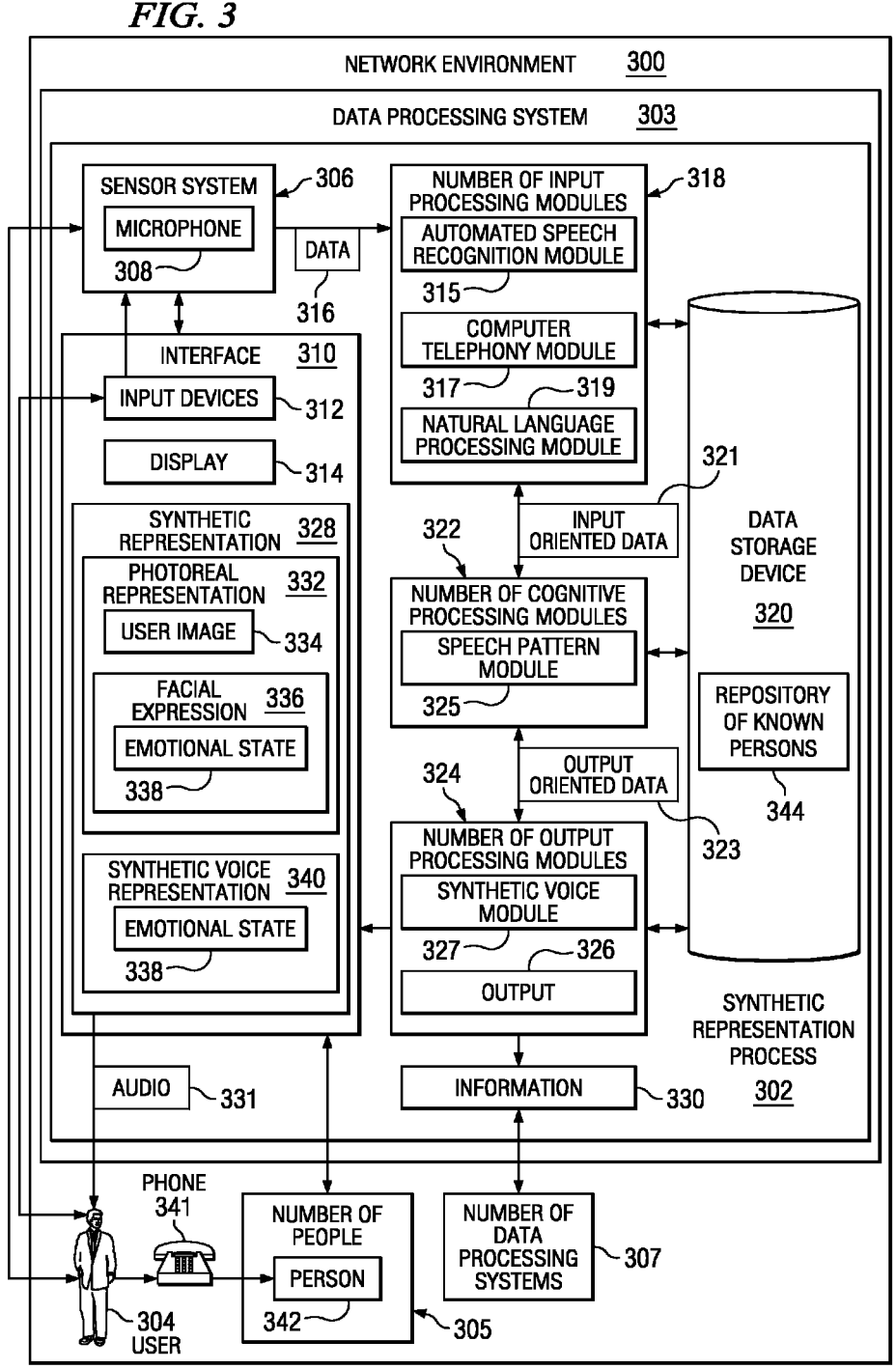
FIG. 3 is an illustration of a network environment in accordance with an advantageous embodiment.

With reference now to FIG. 3, an illustration of a network environment is depicted in accordance with an advantageous embodiment. Network environment 300 may be an example of one implementation of network 102 in FIG. 1. Network environment 300 includes synthetic representation process 302, data processing system 303, and number of data processing systems 307. User 304 and number of people 305 may be an example of those who may use and/or interact with synthetic representation process 302 within network environment 300. Synthetic representation process 302 may be implemented on data processing system 303. Data processing system 303 may be implemented using data processing system 200 in FIG. 2 in this illustrative example.

Synthetic representation process 302 may be an example of a synthetic representation process that passively learns from user 304 and autonomously executes tasks on behalf of user 304. Learning may refer to a process of gaining information about a specific user directly, storing the information, and building upon that information each time new information is obtained about the specific user to develop more precise information about the specific user over time. Learning is continuous and specific to the user, not merely a receipt of generalized knowledge from a subject matter expert, so that the knowledge captured is more than just a snapshot in time. Passively learning may refer to learning unobtrusively in relation to the specific user about which information is being obtained, so that the specific user is not encumbered by the learning or required to devote time and attention towards the learning. Current systems may not employ passive learning, requiring considerable time and attention by a user to train an intelligent system in order to supply that system with the information needed to execute tasks.

In this illustrative example, synthetic representation process 302 may include sensor system 306. Sensor system 306 may contain a number of different sensors, such as microphone 308 for example, to detect input from user 304. Sensor system 306 may be used by synthetic representation process 302 to monitor user 304 and learn from user 304 over time. For example, synthetic representation process 302 may use sensor system 306 to monitor phone calls, conversations with other people, interactions with other people, and computing activities to passively monitor and learn from user 304.

In an illustrative example, microphone 308 may be one sensor of sensor system 306 used to detect acoustic data from user 304, such as speech for example. Speech may be detected from user 304 during a number of instances, such as, for example, without limitation, a conversation held in the office of user 304. Synthetic representation process 302 may also include interface 310. In an advantageous embodiment, interface 310 may be a graphical user interface including input devices 312 and display 314. Display 314 may be an example of one implementation of display 214 in FIG. 2, for example. Input devices 312 may receive input from user 304, such as keystrokes on a keyboard peripheral or mouse clicks on a mouse peripheral for example. The input received from user 304 by input devices 312 may be further processed by sensor system 306.

Input received by synthetic representation process 302 may be processed by a number of processing modules that are each individually autonomous. Each of the processing modules in synthetic representation process 302 adhere to encapsulation and information hiding, but share data and information through a publish/subscribe mechanism. For example, each processing module may publish a "heartbeat" to indicate an active state, and alerts for problems or error conditions detected. Additionally, each of the processing modules may be capable of data encryption to provide user privacy.

Each of the processing modules may have their own internal architecture with one or more sub-modules. Architectures with one or more sub-modules may include multi-threading capabilities for simultaneous execution. The processing modules internally maintain core data and information, and separate publishable information from private, internal-only information. For example, publishable information from mental state recognition module 514 in FIG. 5 would be the current mental state, a time stamp associated with the current mental state, and a list of prior mental states and their associated time stamps. In this example, private, internal-only information may be the specific data elements, parameters, and inputs used to determine the current mental state. These parameters may include, for example, low-level parameters related to tone of voice, speech patterns, hand gestures, head gestures, interactivity with a keyboard, and the like.

The input received from user 304 by sensor system 306 and input devices 312 may be sent as data 316 to number of input processing modules 318. Number of input processing modules 318 may process data 316 to form input-oriented data 321. As an illustrative example, number of input processing modules 318 may include, without limitation, automated speech recognition module 315, computer telephony module 317, and natural language processing module 319. Computer telephony module 317 may be capable of providing information detected from user interaction over a telephone to synthetic representation process 302. For example, user interaction over a telephone may include a conversation held over a phone, a call placed to synthetic representation process 302 by user 304 over a mobile phone, personal digital assistant, or other similar device, and/or any other suitable instance for detecting speech from user 304. In effect, user 304 may conference in synthetic representation process 302 to any phone call made by the user in order to allow synthetic representation process 302 to passively learn from user interactions over the phone.

Data storage device 320 may include stored information from previously processed data that is used by the number of different processing modules of synthetic representation process 302 to compare against learned information and store currently processed information. For example, data storage device 320 may include repository of known persons 344. Repository of known persons 344 may include information about a number of persons, including acoustic data specific to a number of persons, visual data specific to a number of persons, and/or any other information used for identifying a person. Each module in synthetic representation process 302 may locally store its own data necessary for its operation. This locally stored data may include both public and private data. In an illustrative example, if data stored by module A is required by module B, the dependent module B may request access to information stored on module A through an application program interface, for example.

Repository of known persons 344 includes information about user 304 that enables synthetic representation process 302 to identify user 304. The first time user 304 encounters synthetic representation process 302, synthetic representation process 302 may initiate a dialogue with user 304, for example. In this example, synthetic representation process 302 may obtain acoustic data specific to user 304 that may be stored in repository of known persons 344 for future reference.

For other users, such as number of people 305 for example, synthetic representation process 302 may use the context of the information detected to identify a person and store that information in repository of known persons 344. For example, if user 304 calls person 342 using a specific number and says "Hi Bob," that number and the name "Bob" may be associated with person 342. Further, person 342 may respond, and synthetic representation process 302 may save the acoustic data of that response as another piece of information used to identify person 342 as "Bob" in the future.

Input-oriented data 321 may be further processed by number of cognitive processing modules 322 to form output-oriented data 323. As an illustrative example, number of cognitive processing modules 322 may include, without limitation, speech pattern module 325. This processing by number of cognitive processing modules 322 may result in cognitive decision making based on the data received in input-oriented data 321. For example, speech detected by microphone 308 may be processed by a natural language processing module 319 of number of input processing modules 318 to create a natural language representation of the speech detected. This natural language representation may then be processed by speech pattern module 325 of number of cognitive processing modules 322 to perform analysis of the speech pattern of user 304 and develop an internal representation of the speech pattern of user 304. This internal representation of the speech pattern may also be provided as output-oriented data 323.

Output-oriented data 323 may then be processed by number of output processing modules 324 to form output 326. As an illustrative example, number of output processing modules 324 may include, without limitation, synthetic voice module 327. Synthetic voice module may be used to create synthetic voice representation 340, transmitted as output 326. Output 326 is sent to interface 310. Output 326 may be presented by interface 310 as synthetic representation 328, information 330, and/or audio 331. Information 330 may be data and/or commands that may be sent to number of data processing systems 307.

Synthetic representation 328 is a virtual representation of user 304. Synthetic representation 328 may include photoreal representation 332 and synthetic voice representation 340. Photoreal representation 332 is a virtual representation of an appearance, or visible representation, of user 304. Synthetic voice representation 340 is a virtual representation of an audible representation of user 304. Photoreal representation 332 may include user image 334 and facial expression 336, which enable photoreal representation 332 to visually appear as user 304 would appear with facial expressions specific to user 304. Facial expression 336 and synthetic voice representation 340 may include emotional state 338, which contains information associated with non-verbal and verbal communication used to express a particular emotional state specific to user 304. Information used to express a particular emotion may include, without limitation, a gesture, facial expression, tone of voice, and the like. User image 334 may be a two-dimensional or three-dimensional image that looks like user 304.

In an illustrative example, microphone 308 may have captured speech from user 304 and number of input processing modules 318, number of cognitive processing modules 322, and number of output processing modules 324 may have been used by synthetic representation process 302 to create synthetic voice representation 340, which sounds like the voice of user 304.

In this illustrative example, when user 304 places a call over phone 341 to person 342 in number of people 305, computer telephony module 317 may capture the existence of the telephone call and provide voice channel access to automated speech recognition module 315. Computer telephony module 317 may save the voice channel content, and automated speech recognition module 315 may transform the speech content to text, save the text, and synchronize the text with the voice channel content saved by computer telephony module 317. Automated speech pattern module 315 may then analyze the speech content to create a speech pattern for user 304. Synthetic voice module 327 monitors automated speech recognition module 315 for new voice content, and when new content is found, looks for key words and/or phonemes in the new text. Synthetic voice module 327 may then create a synthetic representation, or model, of the voice detected by the automated speech recognition module, and update the model over time to fill in specific characteristics and/or patterns. As a result, synthetic voice representation 340 not only sounds like the voice of user 304, but will have the appropriate tone and sentiment for the discussion synthetic voice representation 340 is executing on behalf of user 304. In another illustrative example, the number of processing modules may be used detect a command from user 304 and respond to that command by executing a task, for example.

Photoreal representation 328 may be presented over interface 310 to number of people 305. In these illustrative examples, interface 310 may be distributed across network environment 300. For example, interface 310 may be distributed across a number of data processing systems, such as number of data processing systems 307. Information 330 may also be presented by interface 310 to number of data processing systems 307. For example, synthetic representation process 302 may create and send an electronic message on behalf of user 304 to number of people 305 over number of data processing systems 307.

Synthetic representation process 302 is capable of directly interacting with a number of people, applications, systems, computers, and networks on behalf of user 304. Synthetic representation process 302 provides a synthetic representation of user 304 that looks like user 304, sounds like user 304, verbally and non-verbally communicates like user 304. The synthetic representation learns to think like user 304, understand how user 304 works, and understands how user 304 processes information, so that tasks can be offloaded from user 304 to the synthetic representation of user 304.

User 304 is not encumbered by this learning because synthetic representation process 302 passively learns by monitoring user 304 without demanding attention of user 304. As a result of this passive learning capability, synthetic representation process 302 does not require valuable time from user 304 for training, uses the specific knowledge and expertise of user 304, continually learns and expands over time, and leverages the relationships and history of user 304 with other people and with applications, systems, networks, and the like.

Additionally, synthetic representation process 302 is available at all times to answer time critical questions and provide information or support when urgent action items arise. Synthetic representation process 302 can perform tasks in parallel with user 304 in order to decrease task completion and response time.

The illustration of network environment 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, the components of synthetic representation process 302 may be distributed throughout network environment 300. Data storage device 320 may be located in a remote location from the number of processing modules, or may be integrated with the number of processing modules, for example.

Figure 4:
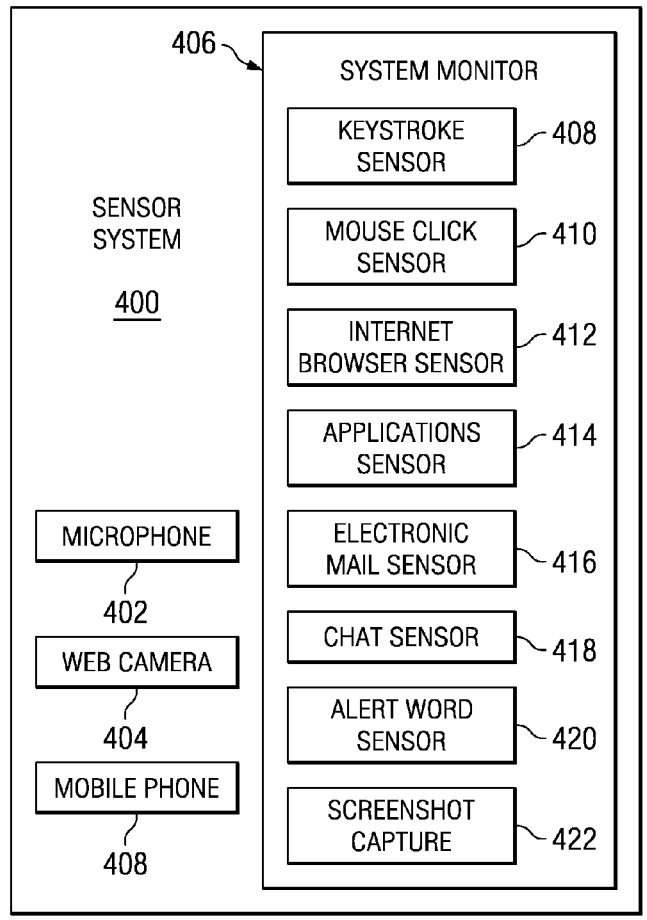
FIG. 4 is an illustration of a sensor system in accordance with an advantageous embodiment.

With reference now to FIG. 4, an illustration of a sensor system is depicted in accordance with an advantageous embodiment. Sensor system 400 may be an example of one implementation of sensor system 306 in FIG. 3.

Sensor system 400 may include microphone 402, web camera 404, system monitor 406, and mobile phone 408. Microphone 402 may be any sensor capable of detecting acoustic data. Web camera 404 may be any image capturing device capable of detecting visual images. System monitor 406 may include a number of sensors for monitoring and detecting computing activities of a user, such as user 304 in FIG. 3 for example.

System monitor 406 may include, for example, without limitation, keystroke sensor 408, mouse click sensor 410, internet browser sensor 412, application sensor 414, electronic mail sensor 416, chat sensor 418, alert word sensor 420, screenshot capture 422, and/or any other suitable sensor for monitoring computing activities of a user.

Keystroke sensor 408 may record and analyze all keystroke activity on a peripheral device, such as a keyboard, connected to a computing device. Mouse click sensor 410 may record and analyze mouse activity, such as mouse clicks at specific locations of a user interface in a computing device, for example. Internet browser sensor 412 monitors and records all internet use, including specific addresses visited and specific actions associated with the specific address, such as utilizing a web email client to create and send a message to a specific person. Application sensor 414 records and analyzes all usage of applications on a computing system, including specific actions taken using specific applications. Electronic mail sensor 416 records and analyzes all electronic messaging transmitted and received by a number of electronic messaging clients on a computing device and/or accessed by a computing device.

Chat sensor 418 may record and analyze usage of instant messaging applications, including the specific person communicating with the user and the dialogue communicated. Alert word sensor 420 may be tailored to monitor for specific words used in any of the applications of a computing device, and associated with screenshot capture 422 to capture a screenshot whenever an alert word is detected.

Mobile phone 408 may be any type of mobile device such as, without limitation, a cellular phone, a digital phone, a personal digital assistant, a smart phone, and/or any other suitable device for connecting to a network, such as network environment 300 in FIG. 3. Mobile phone 408 may be used by a user, such as user 304 in FIG. 3, to place a call to synthetic representation process 302, for example. Mobile phone 408 may represent any type of mobile device employed by the user. Mobile phone 408 may have a computer telephony module, such as computer telephony module 317 in FIG. 3, installed in order to provide information detected over mobile phone 408 to a synthetic representation process, such as synthetic representation process 302 in FIG. 3. In an illustrative example, if user 304 in FIG. 3 places a phone call over mobile phone 408, a copy of the voice channel may be routed to synthetic representation process 302 in order to monitor the user interaction over mobile phone 408. In another illustrative example, a user placing a call over mobile phone 408 may need to first conference in synthetic representation process 302 before placing the call to an intended third party in order to route the voice channel to synthetic representation process 302.

The illustration of sensor system 400 in FIG. 4 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 5:
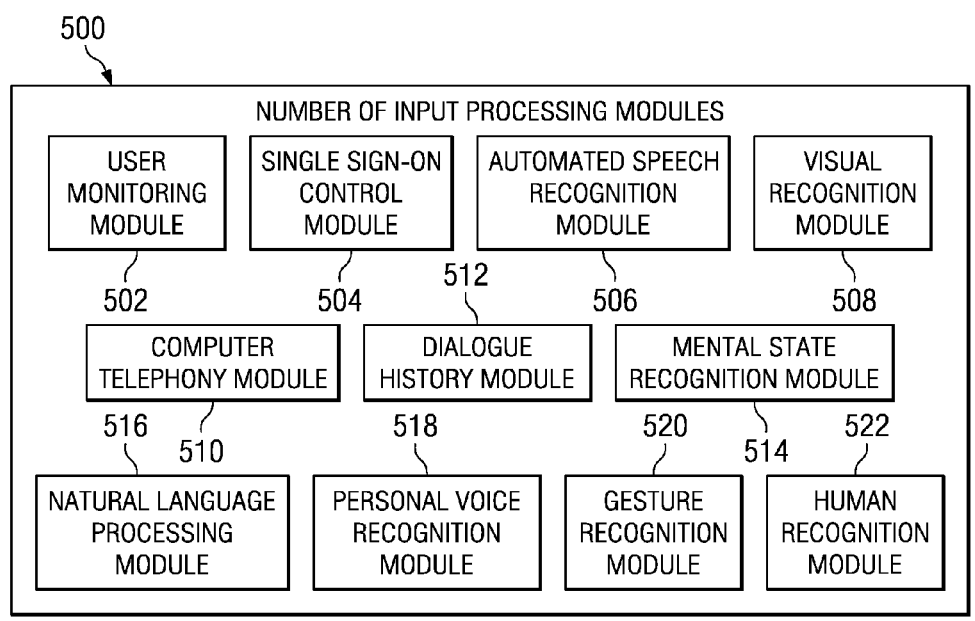
FIG. 5 is an illustration of a number of input processing modules in accordance with an advantageous embodiment.

With reference now to FIG. 5, an illustration of a number of input processing modules is depicted in accordance with an advantageous embodiment. Number of input processing modules 500 may be an example of one implementation of number of input processing modules 318 in FIG. 3.

Number of input processing modules 500 are processing modules capable of processing a number of inputs received from a user, such as user 304 in FIG. 3, and generating input-oriented data based on the number of inputs processed. Number of input processing modules 500 may includes user monitoring module 502, single sign-on control module 504, automated speech recognition module 506, visual recognition module 508, computer telephony module 510, dialogue history module 512, mental state recognition module 514, natural language processing module 516, personal voice recognition module 518, gesture recognition module 520, and human recognition module 522.

User monitoring module 502 captures user computing activities, such as, without limitation, logging on, logging out, keystrokes, mouse clicks, applications used, servers accessed, files accesses, web sites visited, and the like. User monitoring module 502 may be integrated with a system monitor, such as system monitor 406 in FIG. 4, or may access a system monitor to process data inputs detected by the system monitor. User monitoring module 502 maintains corresponding context information for each captured activity, and stores the captured activity and corresponding context information internally. Context information may include, for example, without limitation, time, extraction of task metadata, and other suitable information for establishing a context for a specific activity. This collection of computing activity information about the user may be stored locally on user monitoring module 502, and/or remotely on a data storage device, such as data storage device 320 in FIG. 3, for example. The stored computing activity information provides a history of the user's computing activity that is continually updated whenever computing activity of the user is detected.

Single sign-on control module 504 manages the identity of a user and certificates for system access by the user. Single sign-on control module 504 monitors the presence of a user, including, without limitation, the log-in of a user, the time of a log-in, the location of a log-in, and/or other suitable information for managing the presence of the user. For example, the user may be able to log-in at multiple locations, such as a personal computer, a laptop computer, a personal digital assistant, a smartphone, a voice-over-internet-protocol phone, and/or any other suitable location for accessing the synthetic representation process.

Single sign-on control module 504 may process keyboard inputs to identify system commands, such as a log-in command for example. Single sign-on control module 504 maintains system control authority over the synthetic representation process, such as synthetic representation process 302 in FIG. 3, and is capable of shutting down, pausing, activating, and otherwise internally controlling the synthetic representation process. Single sign-on control module 504 provides the means for authoritative control of a synthetic representation process by its user, through a standard application interface. In other words, the user can stop, halt, pause, or reboot his or her synthetic representation process at any time. The user can halt his or her synthetic representation process, install an updated version, and then restart his or her synthetic representation process. A user may control his or her synthetic representation process using single sign-on control module 504 to determine which information the user wants the synthetic representation process to store. For example, single sign-on control module 504 may be used to prohibit certain activities from being monitored or certain information from being recorded. In another example, single sign-on control module 504 may allow a user to erase or strike certain information from its memory or data store. Certain information may include, for example, without limitation, a conversation, a computing activity, and/or any other action made by the user and monitored by the user's synthetic representation process.

Automated speech recognition module 506 processes acoustic data or audio inputs of a user. Automated speech recognition module 506 is capable of performing speech-to-text translation. Audio files, associated meta-data, text files, and text file meta-data are stored by automated speech recognition module 506. This information may be stored internally or remotely at a data storage device.

Visual recognition module 508 processes visual data or video inputs of a user. Visual recognition module 508 creates an image representation of the person captured on video, identifies key features and/or discriminators, and creates a control model for the synthetic representation. Visual recognition module 508 identifies facial expressions and maps the identified facial expressions to the video input and a time input in order to identify context for the facial expressions. As visual recognition module 508 receives more input, the control model is modified to increase the accuracy of the synthetic representation of the user. Visual recognition module 508 may also store a number of control models of persons other than the user that may be used to identify a number of persons that interact with the user. The input, associated context, and information learned about the input are stored by visual recognition module 508 locally and/or remotely to form a repository of known or recognized people. Visual recognition module 508 is capable of knowing when it cannot recognize an expression or person and stores the expression or image of the person as an unidentified expression or unidentified person.

Computer telephony module 510 performs telephone connection management, including executing all dialing protocols, managing busy signals, redialing, and the like. Computer telephony module 510 provides phone connection, or channels, to external entities. For example, computer telephony module 510 provides voice channel access to automated speech recognition module 506. Computer telephony module 510 publishes alerts for notification of new, lost, or terminated connections, and saves voice channel content. Computer telephony module 510 may also be used as an output processing module.

Dialogue history module 512 creates and manages the history of dialogue between two or more people.

Dialogue history module 512 may also analyze and create context history for each dialogue and associate the context history with the dialogue. Dialogue history module 512 may also be capable of analyzing speech input to determine tone of voice, and associate that tone of voice to the text to form a context for the tone of voice used, for example. This may be important in order to associate tone of voice, and a feeling indicated by that tone of voice, with respect to a specific discussion, on a specific topic, with a specific person or set of people, and so on.

Mental state recognition module 514 processes multiple inputs to determine the mental state of the user or another person. Mental state recognition module 514 uses facial expressions, hand gestures, tone of voice, context of dialogue, and prior mental state to determine the current mental state. Mental state recognition module 514 interacts with visual recognition module 508 to obtain facial expressions and hand gestures. Mental state recognition module 514 interacts with automated speech recognition module 506 to obtain tone of voice. Mental state recognition module 514 interacts with dialogue history module 512 to obtain context of a current dialogue. Mental state recognition module 514 processes the information received from the number of other processing modules, as well as any stored information specific to the person being analyzed, in order to determine the current mental state of that person. Each time mental state recognition module 514 determines a current mental state, that mental state is stored with a time stamp in order to create a repository of prior mental states that can be used in future analysis.

Natural language processing module 516 processes human natural language input received in information detected by a sensor system, such as sensor system 306 in FIG. 3 for example. Information processed by natural language processing module 516 may include acoustic data, such as speech for example, and/or textual data, such as an email sent by the user for example. Natural language processing module 516 internally creates and stores natural language representations of the human natural language input received. Natural language processing module 516 may perform analysis of common meaning and/or understanding of words identified in the input. The natural language representations created by natural language processing module 516 are person-specific, and have the same tone, modulation, inflection, and so on as that of the human communication it represents. Natural language processing module may interact with speech pattern module 610 in FIG. 6 to create natural language representations with appropriate tone, modulation, and inflection as that of the user. Speech pattern module 610 may be used to analyze recorded speech and/or text to create a representation of the user's speech patterns. Speech pattern module 610 may also be used to generate a synthetic voice representation, such as synthetic voice representation 340 in FIG. 3 based on the speech pattern representations created for the user. Personal voice recognition module 518 evaluates acoustic data input and determines if a detected human voice is that of a known person. Personal voice recognition module 518 uses the voice signal as well as the content and speech pattern of the input, and compares the data to a repository of known persons. Personal voice recognition module 518 is capable of knowing when it cannot match a voice, or when there is a degree of uncertainty. In the case of uncertainty, personal voice recognition module 518 is capable of presenting a list of candidates. Gesture recognition module 520 evaluates visual information or video input and determines if hand gestures are present and recognizable. Gesture recognition module 520 may maintain an internal repository of gestures, as well as associations between certain gestures and specific persons and/or time references. Gesture recognition module 520 is capable of distinguishing between random hand movement and gestures, and is also capable of knowing when it does not recognize a gesture. In the case of a gesture that is unrecognized, gesture recognition module 520 stores a video of that gesture with an associated tag indicating it as an unknown gesture. The synthetic representation process may schedule an appointment with its user based on storage of an unknown gesture. During the appointment with the user, the synthetic representation process may ask the user to identify the number of unknown gestures stored by gesture recognition module 520. The synthetic representation process may use this appointment with the user to clarify any items it was unable to resolve. In an illustrative example, there may not always be sufficient contextual data for synthetic representation process to resolve every item or question. An appointment with the user, such as in this illustrative example of an unknown gesture, allows synthetic representation process to resolve questions and fine-tune its capabilities for future processing, such as future gesture recognition.

Standard gestures that are cross-cultural may be stored in gesture recognition module 520. Images or sequences of hand movements may be analyzed by gesture recognition module 520 if the movements are longer than a random hand movement to determine if an intentional gesture is being made. Image matching technology may be used by gesture recognition module 520 to identify repeated patterns of hand and/or finger gestures over multiple observations of a number of people. Repeated patterns may then be stored in the set of standard gestures in gesture recognition module 520.

Human recognition module 522 evaluates multiple inputs and determines if a person is recognized or identified as a specific individual. Human recognition module 522 may evaluate video input, audio input, facial expressions, gestures, speech patterns, and the like in order to determine if a person is recognized. Human recognition module 522 may also incorporate behavioral indicators when determining whether a person is recognized. For example, behavioral indicators may include, without limitation, where the synthetic representation process is being accessed or by what device, where the process should be, the time the process is being accessed, and other like indicators.

In an illustrative example, if the user places a call to his synthetic representation process from his office phone in Seattle, Wash., but the user is also logged in to his notebook computer, and user monitoring module 502 determines the notebook computer is in Los Angeles, Calif., by cross-correlating information from multiple processing modules, the synthetic representation process can determine if there are any inconsistencies. In this illustrative example, the behavioral indicators may indicate that either the user placing the call or the user logged into the notebook computer is not an authentic user, as the user cannot be in more than one location at the same time. The synthetic representation process may then determine which "user" is the authentic user. In one illustrative example, the synthetic representation process may require a security password to verify the identity of the authentic user. In another illustrative example, the synthetic representation process may require a safe word and/or phrase when presented with an inconsistency, where one word and/or phrase indicates that the user is present and all is well, and where another word and/or phrase indicates the user is present but needs help. The user may need help for a number of reasons, including, without limitation, encountering a technical issue or being under duress. In the case of a word and/or phrase indicating a technical issue, the synthetic representation process may send a communication to a help desk or information technology desk, for example. In the case of a word and/or phrase indicating duress, for example, the synthetic representation process may receive the word and/or phrase and block access to all information, identify the location of the user, set security measures in motion, send a communication for help to another person, such as a help desk or security team, and/or any other suitable response determined by the user when the safe word and/or phrase is set up, for example.

The illustration of number of input processing modules 500 in FIG. 5 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 6:
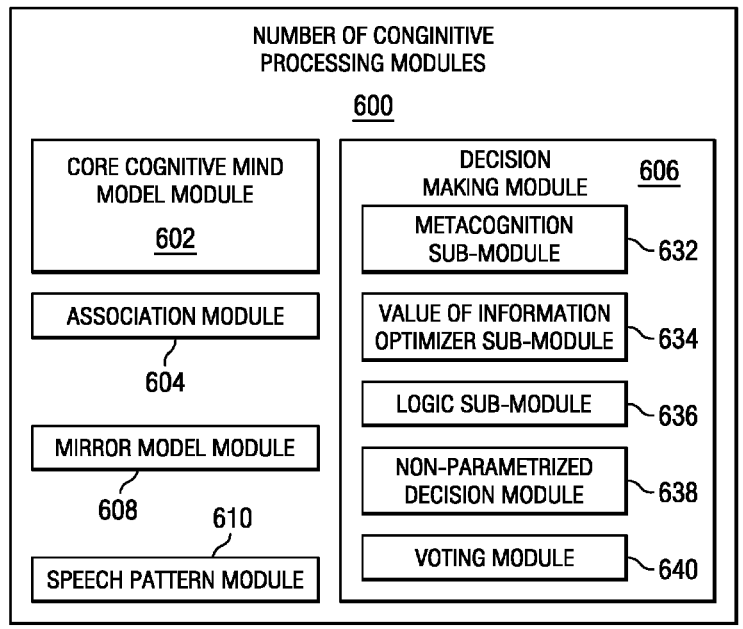
FIG. 6 is an illustration of a number of cognitive processing modules in accordance with an advantageous embodiment.

With reference now to FIG. 6, an illustration of a number of cognitive processing modules is depicted in accordance with an advantageous embodiment. Number of cognitive processing modules 600 may be an example of one implementation of number of cognitive processing modules 322 in FIG. 3.

Number of cognitive processing modules 600 is capable of processing input-oriented data received from a number of input processing modules, such as number of input processing modules 500 in FIG. 5, and generates output-oriented data. Number of cognitive processing modules 600 may include core cognitive mind model module 602, association module 604, decision making module 606, mirror model module 608, and speech pattern module 610. Core cognitive mind model module 602 is the central cognitive processing module for synthetic representation process 302 in FIG. 3. Core cognitive mind model module 602 integrates a number of sub-modules for developing and maintaining cognitive awareness, and is able to identify what it does and does not know or understand.

Core cognitive mind model module 602 is the central cognitive processing module for synthetic representation process 302 in FIG. 3. Core cognitive mind model module 602 integrates a number of interacting sub-modules for developing and maintaining cognitive awareness, as it separates and prioritizes content or events into foreground and background processing, performs both types of processing serially and in parallel, and is able to identify what it does and does not know or understand. In an illustrative example of performing both types of processing serially and in parallel, core cognitive mind model module 602 may search for a file and talk to a user simultaneously. Core cognitive mind model module 602 continuously operates in an observe-orient-decide act cycle so that it can properly and autonomously operate in an environment and select context-appropriate actions and behavior, including the expression of emotion. The cognitive processing of core cognitive mind model module 602 may occurs multiple times every second, and some foreground and background processing may occur over multiple cycles, such as language understanding and executing a task, for example. The key elements of the cognitive processing include, but are not limited to, problem solving, deliberation, negotiation, and constraint satisfaction. These cognitive processing elements enable core cognitive mind model module 602 to create possible solutions for the current situation, goal, or problem, evaluate the possible solutions, and select the appropriate actions or sequence of actions as necessary. The selection of an action by core cognitive mind model module 602 indicates that core cognitive mind model module 602 has determined that the action can be executed, that the action is appropriate and suitable for the current environment, factors in emotions, metacognition, and other behaviors, and that the action is the best available choice Core cognitive mind model module 602 handles multiple simultaneous sensor inputs, each of which is internally processed with respect to identification, categorization, relationship, and emotion of the sensed event, which is then maintained in short-term and/or long-term episodic memory. Further, multiple sensory inputs may be gathered or fused by internal processes to form coalitions of content that have more significant meaning than the input from an individual sensor. Further, other internal processes add to the strength of these content coalitions by contributing associations from prior interactions, relationships, or similar situations, such as the reconstruction and use of memories and prior experiences for example. These content collations can be simple, first order events, such as sensing anger in someone's tone of voice for example, fused events, such as sensing anger in someone through a fusion of voice, facial expression, hand gestures, and content of dialogue for example, or an action event, such as a decision made by core cognitive mind model module 602 to take a specific action in response to the current situation for example. These content coalitions then compete to move from background to foreground cognitive processing. This competition is based on relevance, importance, urgency, and insistence to the current environment and situation. Once a specific content coalition moves to foreground processing, all other modules are automatically notified of its existence so they can act accordingly. Once an action has begun to execute, subsequent sensing and internal processing reinforces the continuation of the action.

Association module 604 performs associations across all components used by a synthetic representation process, including the number of different processing modules, sensors, devices, and the like. Association module 604 is capable of associating people, places, things, events, discussions, emotions, and the like in a temporal context.

Decision making module 606 provides decision making recommendations to core cognitive mind model module 602. Decision making module 606 incorporates a number of sub-modules for autonomously making decisions based on a mathematical or scientific foundation. These sub-modules may include, for example, without limitation, metacognition sub-module 632, value of information optimizer sub-module 634, logic sub-module 636, non-parameterized decision sub-module 638, voting sub-module 640, and/or any other suitable sub-module for developing a decision making recommendation.

Metacognition sub-module 632 may integrate fact, logic, and emotion detected by other processing modules into a recommendation for decision making, for example. Metacognition sub-module 632 may override all of the mathematical-based approaches, bringing intuition and experience to bear based on previous and/or similar situations. The numbers produced by an algorithm, used in one of the other sub-modules, may be good inputs or may even bias the final decision, but metacognition sub-module 632 adds experience to the decision making process. In an illustrative example, if one or more of the other sub-modules execute, and the answer returned is fifty, metacognition sub-module 632 may explore previous experiences and determine that the actual numbers previously returned range from 60-70. As a result, in this example, metacognition sub-module 632 may decide that sixty is the best answer based on a blend of experience from metacognition sub-module 632 and input from the other sub-modules.

Value of information optimizer sub-module 634 is an algorithm that may mathematically optimize, minimize or maximize a solution to a problem. Logic sub-module 636 may include logic such as, for example, without limitation, Bayesian logic, Dempster-Shafer logic, fuzzy logic, and/or any other suitable logic for decision making. In one example, Dempster-Shafer logic is based on mathematics, and may be used to compute the probability of an event or outcome based on combining information from multiple sources and degrees of belief. Bayesian logic is a type of Dempster-Shafer logic, where the posterior probability can be computed from the input probabilities of two independent events. In other words, if an observation or event occurs, which of the two inputs is the most likely? Fuzzy logic is based on fuzzy set theory and deals with reasoning that is approximate rather than precise, or binary.

Non-parameterized decision sub-module 638 may integrate emotion, personal relationship information, and/or any other abstract information determined by other processing modules to provide recommendations for non-parameterized decisions. Voting sub-module 640 may deal with decision markets, where multiple algorithms are executed, each determines a solution, and then each algorithm votes or evaluates their solution or all proposed solutions, with the highest vote-getter being selected.

Mirror model module 608 generates a model representing the view of the user towards another person based on previously analyzed dialogues and interactions captures by other processing modules. The model may be influenced by information such as emotion, intent, context, and the like. Mirror model module 608 may internally store a summary perception of a specific person that includes specific details, such as the emotion, intent, context, and so on which the perception is based.

Speech pattern module 610 performs analysis of a user's speech pattern. Speech pattern module 610 may use speech detected by a sensor system, such as sensor system 306 in FIG. 3 for example. The analysis performed by speech pattern module 610 may include analysis of information such as, without limitation, the frequency of specific words used, the type of words used, the type of words used to express a specific sentiment, the length of sentence structure, the type of sentence structure, and/or any other suitable information for analyzing the speech pattern of a user. Speech pattern module 610 may also develop an internal representation of the user's speech pattern based on the analysis. Speech pattern module 610 may be used to analyze recorded speech and/or text to create a representation of the user's speech patterns. Speech pattern module 610 may also be used to generate a synthetic voice representation, such as synthetic voice representation 340 in FIG. 3 based on the speech pattern representations created for the user.

The illustration of number of cognitive processing modules 600 in FIG. 6 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 7:
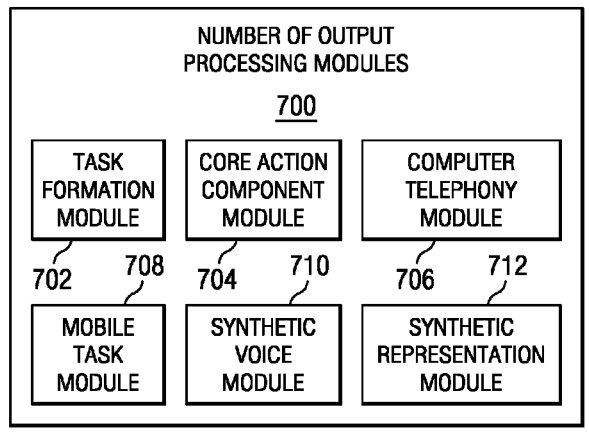
FIG. 7 is an illustration of a number of output processing modules in accordance with an advantageous embodiment.

With reference now to FIG. 7, an illustration of a number of output processing modules is depicted in accordance with an advantageous embodiment. Number of output processing modules 700 may be an example of one implementation of number of output processing modules 324 in FIG. 3.

Number of output processing modules 700 process output-oriented data generated by number of cognitive processing modules 600 in FIG. 6, and may generate output as a result. Number of output processing modules 700 may include, without limitation, task formation module 702, core action component module 704, computer telephony module 706, mobile task module 708, synthetic voice module 710, and synthetic representation module 712.

Task formation module 702 creates a script of actions to be taken in order to meet the specific task or objective the synthetic representation process is tasked to perform. Task formation module 702 may determine how to decompose the task or objective into smaller sub-parts of specific actionable, or executable, steps to compose the script. The specific actionable, or executable, steps that make up the script will be retrieved from core action component module 704, which is a library of actions built from sequences extracted from user monitoring module 502 in FIG. 5. User monitoring module 502 in FIG. 5 captures the user's keystrokes, applications used, computing activities, and more. Task formation module 702 may analyze the data stream captured by user monitoring module 502 in FIG. 5 in order to build segments of actions, such as, for example, how to create an email, how to add an attachment to the email, how to send an email, and the like. Task formation module 702 may save these segments, as well as each individual action that makes up the segments of actions, into a library, such as core action component module 704, for future retrieval. These individual actions may then be arranged, or sequenced, together in a number of different ways by task formation module 702 when creating a script to perform a task or objective. A task or objective may be, for example, without limitation, regular status reporting, task termination, and the like.

Task formation module 702 may also decide if the final output of the formed task or objective, as outlined by the script, will be a mobile task or will be executed by a synthetic representation of the user. A mobile task may be, for example, without limitation, sending an email. The mobile task may not require a synthetic representation of the user in order to accomplish the task as the user would accomplish the task. A task executed by a synthetic representation may be, for example, without limitation, placing a telephone call to a supplier to check on the status of an order. This task may require a synthetic representation of the user that sounds like the user when conducting the phone call.

Core action component module 704 internally creates and maintains a repository of reusable action components. A reusable action component may be, for example, without limitation, how to create an email, hot to attach a file to an email message, how to find a file, how to find the most recent updates in a document, and the like. Core action component module 704 works with user monitoring module 502 in FIG. 5 to process a user's computing activities and create new action components specific to that user's computing activities. Core action component module 704 may also receive segments of actions, and individual actions, from task formation module 702 to store in the repository of reusable actions. The user's computing activity behavior is stored along with specific action to tag the user behavior associated with the specific action. These actions are stored as reusable actions in the repository and enable a synthetic representation process to autonomously execute the same actions in the future in the same way the user would execute the actions. For example, task formation module 702 may retrieve a number of actions stored in core action component module 704 in order to form a script that may be used to execute a task or objective.

Computer telephony module 706 performs telephone connection management, including executing all dialing protocols, managing busy signals, redialing, and the like. Computer telephony module 706 provides phone connection, or channels, to external entities. Computer telephony module 706 publishes alerts for notification of new, lost, or terminated connections. Computer telephony module 706 may also be used as an input processing module.

Mobile task module 708 performs data and file management tasks. For example, without limitation, mobile task module 708 may search, retrieve, create, modify, delete, and the like. Mobile task module 708 may create spawnable objects that operate independently from the synthetic representation process to execute tasks and report back to synthetic representation process with the results of that task. These spawnable objects may be software applications that are able to move across the network, to different servers, to gather information and bring that information back to the synthetic representation process. For example, a spawnable object may be tasked to perform a search through accessible network servers for files related to "Project X." In this illustrative example, the spawnable object may retrieve files, or location information for files, identified as related to "Project X," and report that file information to mobile task module 708. The results of the information reported by a spawnable object may then be made available to the originating requestor module, such as core cognitive mind model module 602 in FIG. 6, for example.

Mobile task module 708 may autonomously perform tasks at the direction of a user given an overall objective or goal. In an illustrative example, a user may ask the synthetic representation process to send the latest version of Document X to Bob Johnson. Mobile task module 708 may perform a number of individual steps such as searching for Document X, determining the latest version, and retrieving the latest version of Document X. In this illustrative example, task formation module 702 may then perform the tasks of creating an email message, attaching the latest version of Document X to the email message, and sending the message with the attachment, using a number of other processing modules to draft an electronic message that mirrors the speech pattern of the user.

Synthetic voice module 710 creates, manages, and updates a synthetic voice representation of the user. Synthetic voice module 710 may use data processed by other processing modules, such as, without limitation, automated speech recognition module 506, natural language processing module 516, and personal voice recognition module 518 in FIG. 5, and speech pattern module 610 in FIG. 6. Synthetic voice module 710 creates a control model for a synthetic voice representation and updates the control model as more input is processed in order to provide a synthetic voice representation that sounds like the user.

Synthetic representation module 712 creates the synthetic representation of the user, such as photoreal representation 334 in FIG. 3 for example. Synthetic representation module 712 synchronizes the synthetic user image, synthetic voice representation, and emotional state of a user in order to generate a synthetic representation of the user that looks, sounds, and interacts just like the user would.

The illustration of number of output processing modules 700 in FIG. 7 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 8:
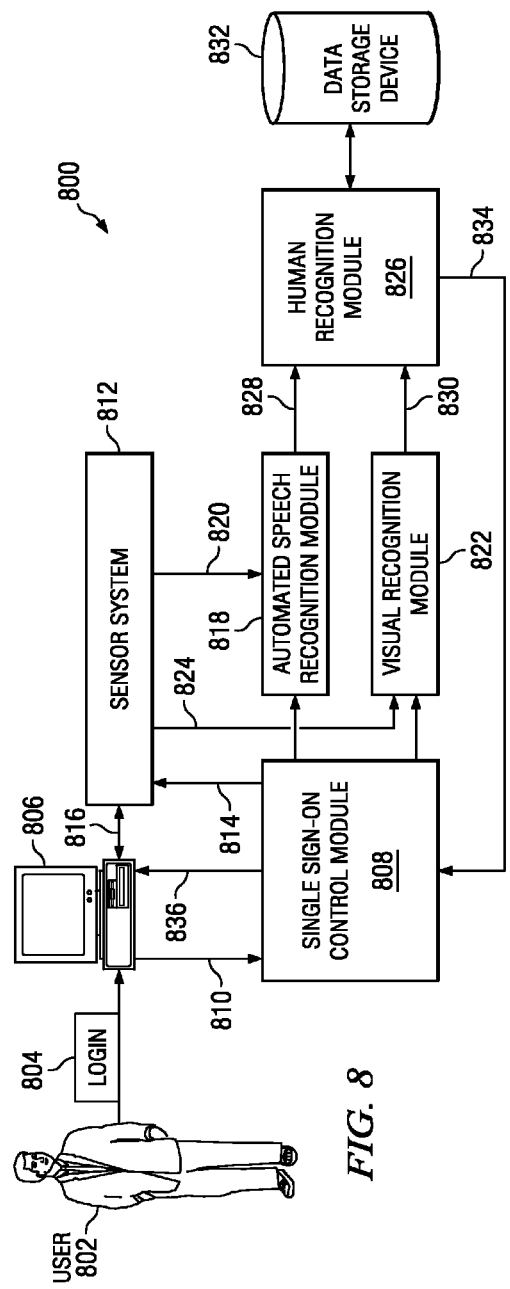
FIG. 8 is an illustration of a detection of the presence of a user in accordance with an advantageous embodiment.

With reference now to FIG. 8, an illustration of a detection of the presence of a user is depicted in accordance with an advantageous embodiment. Synthetic representation process 800 may be an example of one implementation of synthetic representation process 302 in FIG. 3.

User 802 may input login 804 into computing device 806. Computing device 806 may be an example of one implementation of a data processing system on which synthetic representation process 800 may execute. Single sign-on control module 808 receives login 804 as illustrated by arrow 810, and activates sensor system 812 to detect a presence of user 802 as illustrated by arrow 814. Sensor system 812 may be an example of one implementation of sensor system 400 in FIG. 4, for example. Sensor system 812 may be integrated with computing device 806 in an illustrative example, as illustrated by arrow 816.

A microphone and web camera integrated with sensor system 812 may detect audio and video input of user 802. Audio input may be processed by automated speech recognition module 818, as illustrated by arrow 820. Video input may be processed by visual recognition module 822, as illustrated by arrow 824. Automated speech recognition module 818 and visual recognition module 822 may send processed audio and visual information to human recognition module 826, as illustrated by arrows 828 and 830. Human recognition module 826 may use the processed audio and visual information to identify user 802. Human recognition module 826 may compare the information received to internally stored data and/or remotely stored data, such as information in data storage device 832, for example. Human recognition module 826 may identify user 802 if user 802 is a known person, and send the identification information to single sign-on control module 808, as illustrated by arrow 834. This identification information may serve to authenticate user 802 to synthetic representation process 800, and authentication of user 802 is sent to computing device 806, as illustrated by arrow 836.

The illustration of detection of the presence of a user in synthetic representation process 800 in FIG. 8 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 9:
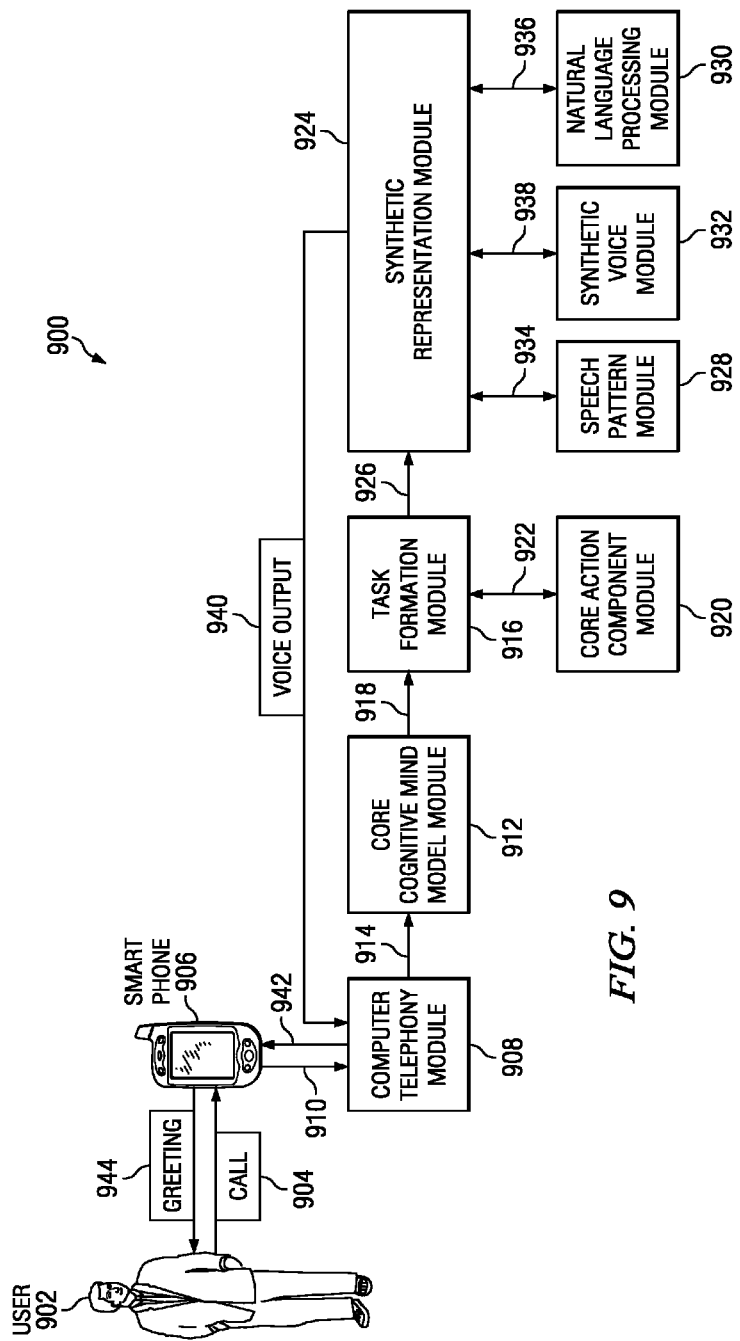
FIG. 9 is an illustration of a user interacting with a synthetic representation in accordance with an advantageous embodiment.

With reference now to FIG. 9, an illustration of a user interacting with a synthetic representation is depicted in accordance with an advantageous embodiment. Synthetic representation process 900 may be an example of one implementation of synthetic representation process 302 in FIG. 3.

User 902 may place call 904 to synthetic representation process 900 over smart-phone 906. Smart-phone 906 may be an example of one implementation of a data processing system operating in a network environment. Synthetic representation process 900 may execute on a data processing system in the same network environment, providing user 902 access to synthetic representation process 900 over smart-phone 906. Computer telephony module 908 detects call 904 as illustrated by arrow 910, and activates core cognitive mind model module 912 in order to determine that a call is being placed to synthetic representation system 900, as illustrated by arrow 914. Core cognitive mind model module 912 may be an example of one implementation of core cognitive mind model module 602 in FIG. 6, for example.

Core cognitive mind model module 912 activates task formation module 916, as illustrated by arrow 918. Arrow 918 may represent a command to task formation module 916 to generate a telephone greeting, for example. Task formation module 916 in turn interacts with core action component module 920, as illustrated by arrow 922, to access a repository of reusable actions, such as "telephone greeting" for example.

Task formation module 916 interacts with synthetic representation module 924, as illustrated by arrow 926, to mobilize synthetic representation module 924 to create a synthetic voice representation. Synthetic representation module 924 in turn accesses speech pattern module 928, natural language processing module 930, and synthetic voice module 932, as illustrated by arrows 934, 936, and 938, respectively. Synthetic representation module 924 uses stored models of the speech pattern, natural language pattern, and voice sound of user 902 to create voice output 940, which is transmitted through a voice channel provided by computer telephony module 908 to smart-phone 906, as illustrated by arrow 942.

The synthetic voice representation then reaches user 902 as greeting 944. For example, when user 902 places call 904 to synthetic representation process 900, the process described above results in user 902 hearing a greeting from synthetic representation process 900, such as "hello, this is Virtual User, how can I help you?", for example.

The illustration of a user interacting with synthetic representation process 900 in FIG. 9 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 10:
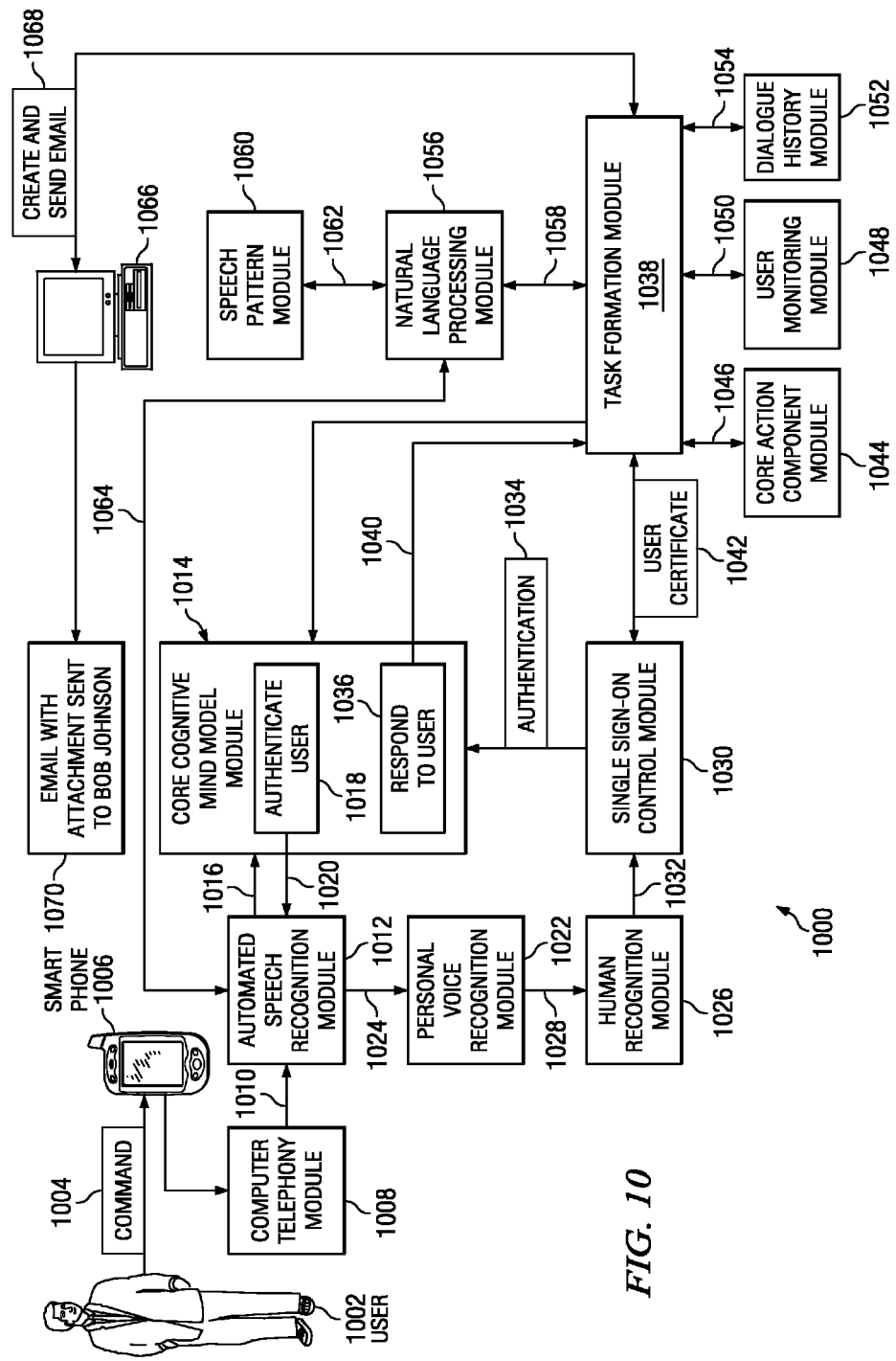
FIG. 10 is an illustration of a synthetic representation executing a task on behalf of a user in accordance with an advantageous embodiment.

With reference now to FIG. 10, an illustration of a synthetic representation executing a task on behalf of a user is depicted in accordance with an advantageous embodiment. Synthetic representation process 1000 may be an example of one implementation of synthetic representation process 302 in FIG. 3.

The illustration depicted in FIG. 10 may be a continuation of the process initiated in FIG. 9, for example, such as a user placing a call to a synthetic representation process. The process depicted in FIG. 10 may be a continuation of that call, including a command by the user to the process, in one advantageous embodiment.

User 1002 may give command 1004 to synthetic representation process 1000 over smart-phone 1006. Command 1004 may be a voice command or a textual command, for example. Computer telephony module 1008 may provide for command 1004 to be received by automated speech recognition module 1012, as illustrated by arrow 1010. Automated speech recognition module 1012 may interact with core cognitive mind model module 1014, as illustrated by arrow 1016, sending information about the detection of speech received in command 1004. Information about the speech detected may include the instructions, request, and/or other contextual information in order for core cognitive mind model module 1014 to understand what command 1004 entails. In this illustrative example, command 1004 may be "send Bob Johnson the latest version of Document X over email."

Core cognitive mind model module 1014 may decide to execute steps to authenticate user 1018, and send that instruction to automated speech recognition module 1012, as illustrated by arrow 1020. Automated speech recognition module 1012 may then interact with personal voice recognition module 1022, as illustrated by arrow 1024 in order to determine if the voice detected in command 1004 matches a known or identified person. Personal voice recognition module 1022 may process the audio data received from command 1004, and further interact with human recognition module 1026 to identify the person associated with the voice detected. Human recognition module 1026 may identify the person to whom the voice making command 1004 belongs, and send the identification information to single sign-on control module 1030, as illustrated by arrow 1032. Single sign-on control module 1030 then uses the identification information to authenticate user 1002, sending authentication 1034 to core cognitive mind model module 1014.

Core cognitive mind model module 1014 then decides to execute tasks to respond to user 1036, and sends instructions to task formation module 1038, as illustrated by arrow 1040. Task formation module 1038 interacts with single sign-on control module 1030 to retrieve user certificate 1042, which may be used to access data storage and files of user 1002 on a personal computing device for example. Task formation module 1038 may also interact with core action component module 1044, as illustrated by arrow 1046, to generate executable steps needed to perform the task respond to user 1036. Core action component module 1044 may provide reusable action components, such as, for example, without limitation, how to create an email, hot to attach a file to an email message, how to find a file, how to find the most recent updates in a document, and the like. Task formation module 1038 may interact with user monitoring module 1048, as illustrated by arrow 1050, to identify what is being requested, such as the latest version of Document X for example. Task formation module 1038 may interact with dialogue history module 1052, as illustrated by arrow 1054, to determine the identify of persons other than user 1002 included in the information processed for command 1004, such as, without limitation, "who is Bob Johnson" or "which Bob Johnson is associated with Document X", for example.

Task formation module 1038 may identify the requested document and intended recipient, and then interact with natural language processing module 1056, as illustrated by arrow 1058, in order to create a message as user 1002 would create the message. Natural language processing module 1056 uses information about the speech detected in command 1004 and processed by automated speech recognition module 1012, as illustrated by arrow 1064. Natural language processing module 1056 further analyzes the information using speech pattern module 1060 as illustrated by arrow 1062. Task formation module 1038 then uses the information processed by natural language processing module 1056 to create and send email 1068 over personal computer 1066. As a result, synthetic representation 1000 autonomously sends email with attachment to Bob Johnson 1070 as requested by user 1002.

The illustration of synthetic representation process 1000 in FIG. 10 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 11:
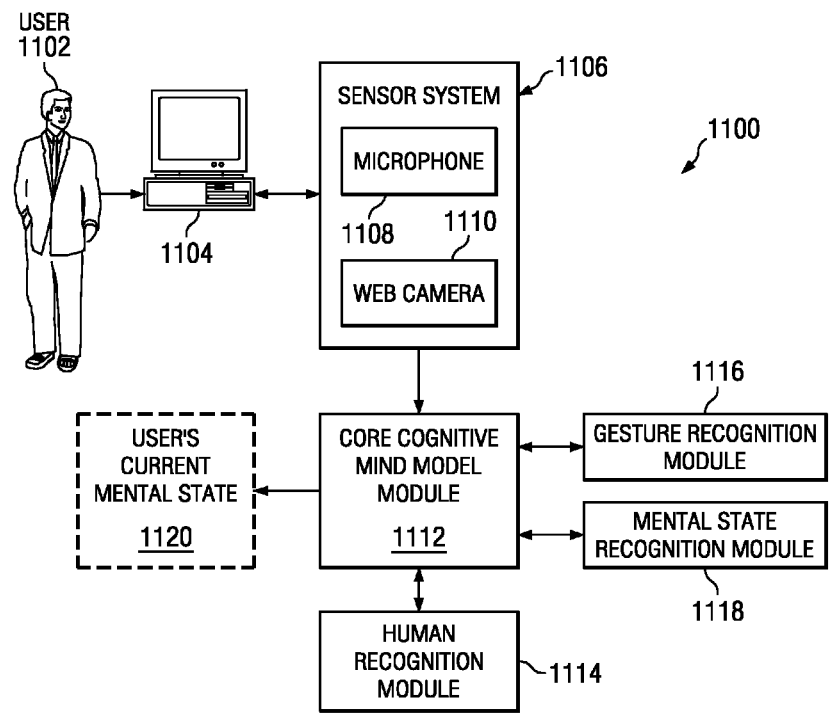
FIG. 11 is an illustration of a detection of the mental state of a user in accordance with an advantageous embodiment.

With reference now to FIG. 11, an illustration of a detection of the mental state of a user is depicted in accordance with an advantageous embodiment. Synthetic representation process 1100 may be an example of one implementation of synthetic representation process 302 in FIG. 3.

User 1102 interacts with computing device 1104. Computing device 1104 may include sensor system 1106. Sensor system 1106 may be an example of one implementation of sensor system 400 in FIG. 4, for example. Sensor system 1106 may include microphone 1108 and web camera 1110 for capturing audio and video input of user 1102. Core cognitive mind model module 1112 may receive audio and video data captured by microphone 1108 and web camera 1110, and interact with human recognition module 1114 to process the data input and identify user 1102. Core cognitive mind model module 1112 may also interact with gesture recognition module 1116 and mental state recognition module 1118 to process the data input and identify the user's current mental state 1120. The current mental state may then be stored internally in mental state recognition module 1118 with a timestamp and used in the future as a prior mental state for user 1102.

The illustration of synthetic representation process 1100 in FIG. 11 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 12:
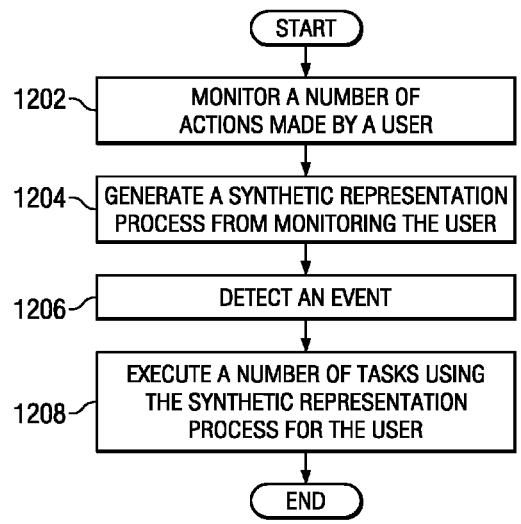
FIG. 12 is a flowchart illustrating a process for executing a number of steps in accordance with an advantageous embodiment.

With reference now to FIG. 12, a flowchart illustrating a process for executing a number of steps is depicted in accordance with an advantageous embodiment. The process in FIG. 12 may be implemented in a network environment, such as network environment 300 in FIG. 3, using a data processing system, such as data processing system 303 in FIG. 3.

The process begins by monitoring a number of actions made by a user (operation 1202). The number of actions made by a user may include, for example, without limitation, actions made by the user with a computer, telephone, number of people, and/or any other actions. For example, an action made by a user may be placing a call on a wired telephone near a computer, placing a call on a mobile phone, or having a conversation with another person in the user's office. The actions monitored by a user may also include computing activities, such as typing an email or document, storing information in a location on a computing system, updating a document, and the like.

The process then generates a synthetic representation process from monitoring the user (operation 1204). Generating a synthetic representation process may include, without limitation, generating a knowledge base specific to the user being monitored, generating a learning process, and/or any other step that may enable the synthetic representation process to learn from monitoring the actions of the user. Once generated, the synthetic representation process may continue to monitor the actions made by the user. Over time, this passive learning by the synthetic representation process will enable the synthetic representation process to become more accurate in a synthetic representation of the user.

Next, the process detects an event (operation 1206). An event may be, for example, without limitation, user input, an email message, a phone call, and/or any other event capable of being detected by the synthetic representation process. For example, an event may be user 304 placing a call over phone 341 to person 342 in FIG. 3. In another illustrative example, an event may be user 802 logging in to computing device 806 in FIG. 8.

In response to the detection of an event, the process executes a number of tasks using the synthetic representation process for the user (operation 1208), with the process terminating thereafter. The number of tasks may include, without limitation, authenticating a user, greeting a user with a synthetic voice representation, finding and retrieving a document, attaching a document to an email message, generating an email message, sending an email message, and/or any other number of tasks that may be performed by a synthetic representation process instead of being performed by a user. The number of tasks performed by the synthetic representation process will be performed just as if the user himself was performing the tasks, in the same manner in which the user would perform the tasks. The number of tasks may represent the synthetic representation process as the user himself would appear and sound if performing the tasks himself.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments take into account and recognize that current intelligent systems, agents, or associates that have been developed to capture domain knowledge and automate reasoning require a considerable effort up-front by domain or subject matter experts. The knowledge of these experts is coded into the knowledge base of the intelligent system. The domain knowledge of these current intelligent systems is a static representation that does not continue to expand or adapt over time as new situations are encountered. Additionally, these current intelligent systems do not represent the specific knowledge and experience of each user that attempts to leverage such a system.

The different advantageous embodiments also take into account and recognize that these intelligent systems are not developed to capture the human dimension of work, namely the emotions and feelings of each user that affect his or her reasoning, and the prior relationships or experiences that the user has with other people in general or with respect to a specific task. Thus, there is need for a mechanism that would create a virtual representation of a user that looks, sounds, thinks, infers, and interacts like its specific user, and autonomously performs tasks and communicates with people in a manner consistent with the behavioral and cognitive model of its specific user.

Thus, one or more of the different advantageous embodiments may provide an apparatus that comprises a processing unit and a synthetic representation process executed by the processing unit. The synthetic representation process may be capable of executing a number of tasks for a user.

The different advantageous embodiments may also provide an apparatus that comprises a network, a processing unit connected to the network, and a synthetic representation executed by the processing unit. The synthetic representation may be capable of integrating a number of processing modules located on the processing unit to execute a number of tasks on behalf of a user.

The different advantageous embodiments may further provide a method for executing tasks. The method may monitor a number of actions made by a user. A synthetic representation process may be generated for the user from monitoring the user. In response to detecting an event, a number of tasks may be executed using the synthetic representation for the user.

The different advantageous embodiments may further provide a computer program product, on a computer recordable storage medium, having computer usable program code for executing tasks. The computer program product may comprise computer usable program code for monitoring the user for input and receiving input data from the user. The input data received may be processed using a number of input processing modules to form input-oriented data. The input-oriented data may be processed using a number of cognitive processing modules to form output-oriented data. The output-oriented data may be processed using a number of output processing modules to form output data. The output may be presented using an interface.

The different advantageous embodiments may provide a synthetic representation of the user with the appropriate and user-specific facial expressions that correspond to the interaction, which is vital to a rich communications and enhanced understanding. The important human elements incorporated into the synthetic representation include the use and understanding of tone, gestures, and intent that occur when a user interacts with other people.

The different advantageous embodiments provide a synthetic representation process that may operate in a network to learn from and represent a specific user. The synthetic representation process learns to perform tasks in a manner that aligns with the expertise, habits, and mental models of performing tasks that are specific to the user. The synthetic representation process focuses on what the user wants, acts as a delegate for tasks the user wants to offload, and provides support and expertise of the user during an absence of the user, all with minimal intrusion into the user's time and attention. The synthetic representation process reduces the cognitive load of the user as well as the overall workload of the user. The user that leverages the synthetic representation process is enabled to increase the amount and quality of information processed as well as the quality of analysis or decisions made, which ultimately increases the speed of business.

The different advantageous embodiments provide a synthetic representation process that only performs tasks or actions when and as directed by the user. Although the synthetic representation process may include levels of autonomy, including autonomous learning and execution of tasks, the synthetic representation process does not run without specific guidance from its user. The user is able to review and monitor the activities of the synthetic representation process as the user desires. The synthetic representation process is constrained in that it may not damage the reputation of a user or any relationship between the user and another person. The synthetic representation process must attempt to comply with the direction given by the user, and must identify itself as a virtual entity.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a network;
a processing unit connected to the network;
a number of sensors connected to the network, wherein the number of sensors are configured to detect input data regarding a user executing tasks, the input data comprising at least one of: visual data, acoustic data, and computing activities;
an input processing module in the processing unit configured to process the data inputs;
a cognitive processing module configured to be executed by the processing unit to identify user tasks to execute in lieu of the user; and
a synthetic representation process configured to be executed by the processing unit, wherein the synthetic representation process comprises a process that autonomously represents itself to at least one of: a person, and a system, while executing a task in lieu of the user executing the task, as if the user were performing the user tasks for the at least one of: the person, and the system, in a manner the user would choose to perform the task and as the user would infer and interact if performing the task, the manner comprising executing the task consistent with a behavioral and cognitive model, the behavioral and cognitive model based upon an emotion and a feeling of the user that affect the user's reasoning.

2. The apparatus of claim 1, wherein the synthetic representation process further comprises:
a number of input devices;
a number of input processing modules configured to process a number of inputs received by the synthetic representation to form input-oriented data;
a number of cognitive processing modules capable of processing the input-oriented data to form output-oriented data;
a number of output processing modules configured to process the output-oriented data to form output; and
an interface configured to present the output, wherein the interface presents the output.

3. The apparatus of claim 2, wherein the interface presents the output as the synthetic representation.

4. The apparatus of claim 1, wherein the synthetic representation process uses the number of sensors to monitor the user, and wherein the synthetic representation process learns about the user through monitoring the user.

5. The apparatus of claim 1, wherein the synthetic representation process is configured to execute the task for the user instead of the task being performed by the user, as if the user was performing the task, in a manner the user would choose to perform the task and as the user would look, sound, and think if performing the task, the manner further comprising at least one of: a prior relationship of the user with the task, a prior relationship of the user with another person, a prior experience of the user related to the task, and a prior experience of the user with another person.

6. An apparatus comprising:
a network;
a processing unit connected to the network; and
a synthetic representation process, configured to be executed by the processing unit, such that the synthetic representation process is configured to integrate a number of processing modules located on the processing unit to execute a number of tasks on behalf of a user, and the synthetic representation process comprises a process that autonomously represents itself to at least one of: a person, and a system; and executes at least one of the number of tasks in lieu of the user executing the at least one of the number of tasks, as if the user were performing the at least one of the number of tasks for the at least one of: the person, and the system, in a manner the user would choose to perform the task and as the user would infer and interact if performing the task, the manner comprising executing the task consistent with a behavioral and cognitive model, the behavioral and cognitive model based upon an emotion and a feeling of the user that affect the user's reasoning.

7. The apparatus of claim 6, wherein the number of processing modules further comprises:
a number of input processing modules configured to process a number of inputs received by the synthetic representation process to form input-oriented data;
a number of cognitive processing modules configured to process the input-oriented data to form output-oriented data; and
a number of output processing modules configured to process the output-oriented data to form output.

8. A method for executing a task in lieu of a user having to execute the task, the method comprising:
monitoring, using a sensor, a number of actions made by the user;
generating, using a processing unit, a synthetic representation process, wherein the synthetic representation process comprises a process that autonomously represents itself as the user to at least one of: a person, and a system; while executing the task in lieu of the user executing the task, using information received from monitoring the user; and responsive to detecting an event, executing the task in lieu of the user having to execute the task, using the synthetic representation process to represent itself, as if the user were performing the task for the at least one of: the person, and the system, in a manner the user would choose to perform the task and as the user would infer and interact if performing the task, the manner comprising executing the task consistent with a behavioral and cognitive model, the behavioral and cognitive model based upon an emotion and a feeling of the user that affect the user's reasoning.

9. The method of claim 8, wherein generating the synthetic representation process further comprises:

generating a knowledge base, wherein the knowledge base stores information learned from monitoring the user.

10. The method of claim 8, wherein generating the synthetic representation process further comprises:

generating a learning process, wherein the learning process obtains information from monitoring the user and stores the information obtained in a data storage device.

11. The method of claim 8, wherein executing the task using the synthetic representation process further comprises:

processing the user input received using a number of input processing modules to form input-oriented data;

processing the input-oriented data using a number of cognitive processing modules to form output-oriented data;

processing the output-oriented data using a number of output processing modules to form output data; and presenting the output data using an interface.

12. The method of claim 8, wherein monitoring a number of actions made by the user further comprises:

detecting a presence of the user; and authenticating the user, wherein the presence of the user is detected and the user is authenticated using a single sign-on control module.

13. The method of claim 8, further comprising:

identifying the user based on captured images, wherein the captured images include video input.

14. The method of claim 8, further comprising:

identifying the user based on captured acoustic data.

15. The method of claim 8, wherein the synthetic representation process is configured to integrate a number of processing modules located on the processing unit to execute the task on behalf of the user.

16. A non-transitory computer recordable storage medium having a computer program product comprising computer usable program code configured to:

monitor input from a user, as the user executes tasks; and integrate a number of processing modules located on a processing unit configured to autonomously decide to execute and then execute, a number of tasks that involve interacting with at least one of: a person, and a system, in lieu of the user having to interact with at least one of: the person, and the system, such that, in lieu of the user comprises: the processing unit configured to interact with the at least one of: the person, and the system as though the user were performing the number of tasks, in a manner the user would choose to perform the task and as the user would infer and interact if performing the task, the manner comprising executing the task consistent with a behavioral and cognitive model, the behavioral and cognitive model based upon an emotion and a feeling of the user that affect the user's reasoning, such that the number of tasks can be offloaded from the number of tasks the user would be required to decide to execute and then execute.

17. The computer program product of claim 16, further comprising computer usable program code for:

responsive to detecting the input from the user, processing the user input received using a number of input processing modules to form input-oriented data;

processing the input-oriented data using a number of cognitive processing modules to form output-oriented data;

processing the output-oriented data using a number of output processing modules to form output data; and presenting the output data using an interface.

18. The computer program product of claim 16, further comprising computer usable program code for:

detecting a presence of the user; and authenticating the user, wherein the presence of the user is detected and the user is authenticated using a single sign-on control module.

19. The computer program product of claim 16, further comprising computer usable program code for:

identifying the user based on captured images, wherein the captured images include video input.

20. The computer program product of claim 16, further comprising computer usable code for:

identifying the user based on captured acoustic data.

* * * * *